United States Patent Office 3,525,250
Patented Aug. 25, 1970

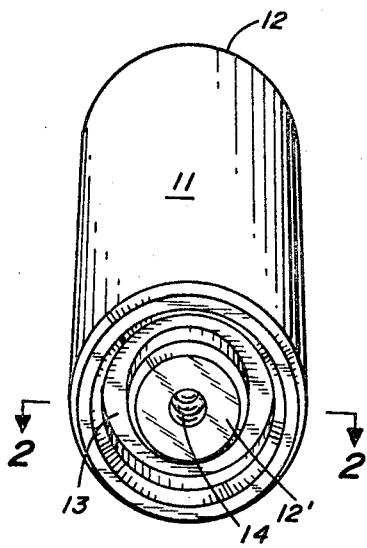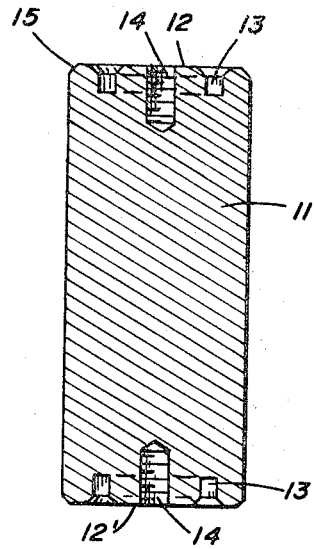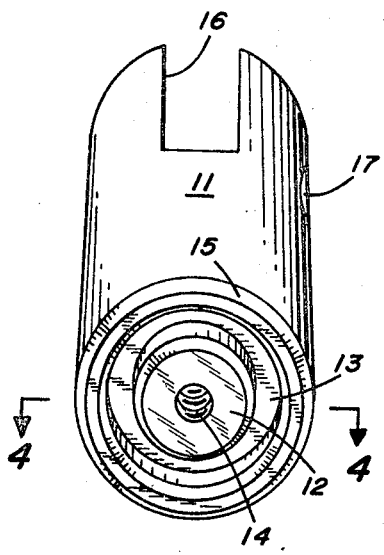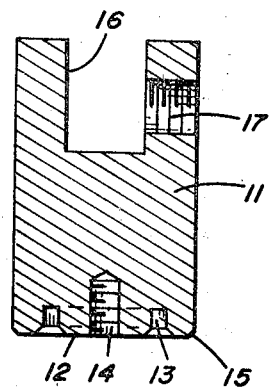

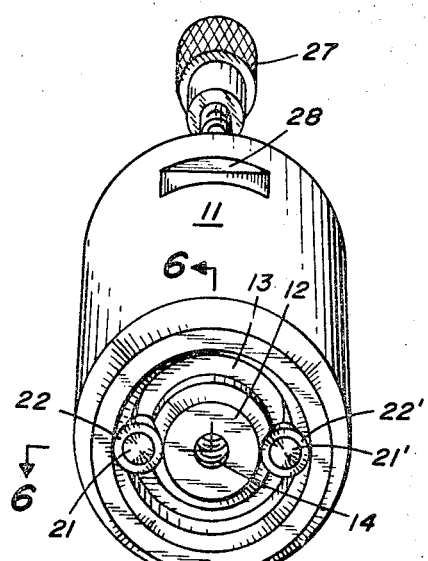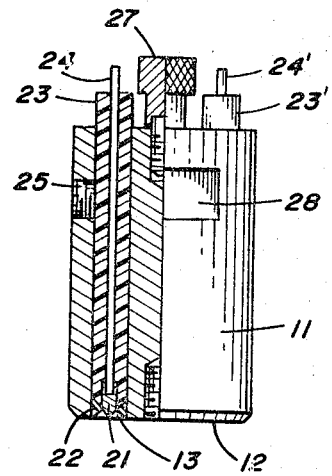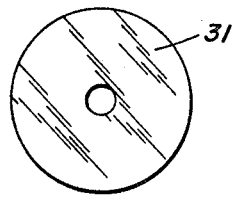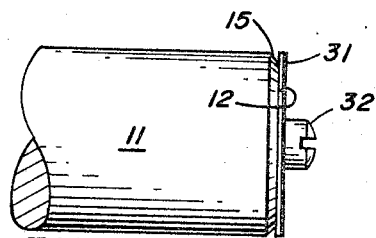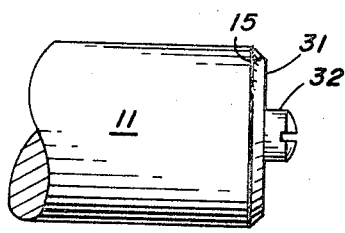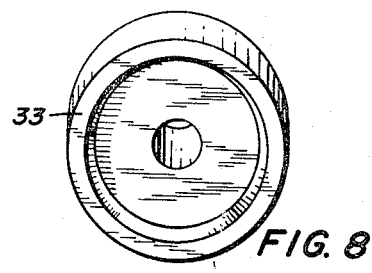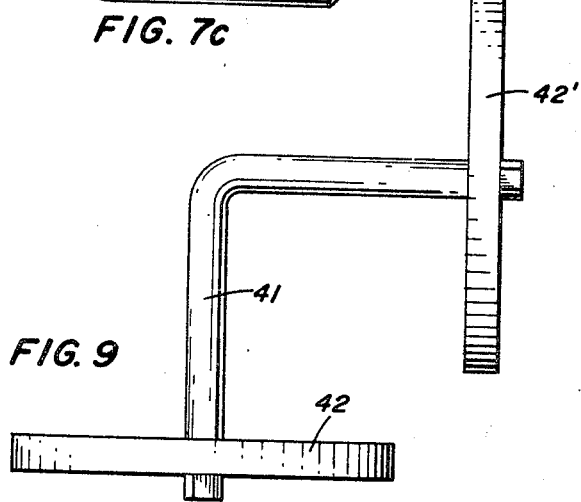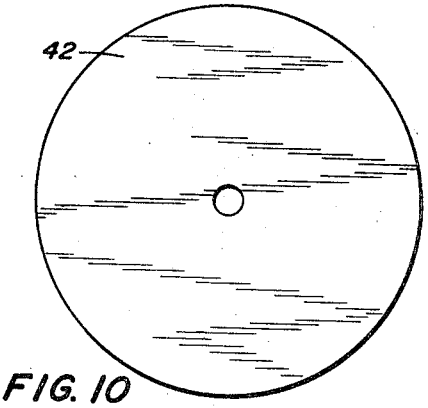

---

3,525,250
DEFORMABLE GAGES
William M. Hurst, Socorro, N. Mex., assignor, by mesne assignments, to the United States of America as represented by the Secretary of the Navy
Filed May 28, 1968, Ser. No. 732,599
Int. Cl. G01l 7/00
U.S. Cl. 73—35                                                        7 Claims

ABSTRACT OF THE DISCLOSURE

This invention is directed to gages which are used to measure the pressures of shock waves. The gages have a solid metallic body. One end of the metallic body has a groove cut into it. The groove is covered with a piece of thin metal. The gage is placed near a source of shock waves and its metal covered face is directed at the source. The shock waves generated by the source cause the thin metal piece to deform into the groove. The deformation of the metal piece is a function of the intensity of the shock waves and provides a measurement of the strength and direction of the shock waves.

---

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

Field of the invention

This invention is directed to gages for measuring the pressures of the shock waves. While these gages are generally utilized to contrast the performance of the various geometries of charges which are exploded in air, they have utility in almost all instances where shock waves are to be measured.

Description of the prior art

In one prior art method of measuring the pressure and indicating the direction of shock waves, piezoelectric gages are used. These gages are very expensive, involve complicated electronic circuitry and require a source of electricity. Furthermore, the measurements achieved are often controversial.

Another means of measuring shock waves disclosed by the prior art utilized a plurality of destructable diaphragms. The pressure of the shock wave was a function of the size of the smallest diaphragm punctured. This means, however, was only as accurate as the number of diaphragms provided and the device used was cumbersome to handle. Furthermore, if particles from a detonated charge or the like struck the diaphragms with a greater force than the shock waves the diaphragms were destroyed and no measurement of pressure could be obtained.

SUMMARY OF THE INVENTION

The present invention represents a substantial improvement over the prior art. The device is easy and inexpensive to construct. It requires no electronic equipment or source of electricity to operate. It gives an accurate measurement through a full range of pressures even when much of its surface area is hit by particles from an exploding charge. Furthermore, visual evaluation of the results of shock waves can be made within a few minutes after they are generated. The gages may also be easily moved and may be set up in a variety of configurations.

The gages of this invention generally utilize a solid steel cylinder. An annular groove is machined on the face of the cylinder and a hole is tapped in the center of the same face. A thin metal disc, which has a concentric opening, is firmly attached to the steel cylinder by a bolt threaded in the center-tapped hole of the gage. The gage is placed near the source of shock waves with the foil facing the source. When the shock waves are set off they strike the foil causing it to deform into the annular groove. The deformation is measured by a micrometer and related to a calibrated chart.

It is an object of this invention to provide a new and improved gage for measuring the pressure of a shock wave.

A further object of this invention is to provide a gage for meausring the pressure of a shock wave which is inexpensive, relatively easy to construct and is easily moved.

Another object of this invention is to provide a gage which provides highly accurate measurements of the pressure of shock waves and which is relatively unaffected by striking particles.

Other objects and advantages of the invention will hereinafter become more fully apparent from the following description of the annexed drawings, which illustrate the preferred embodiments.

BRIEF DESCRIPTION OF THE DRAWINGS

FIG. 1 shows the body of a double-ended gage contemplated by this invention;

FIG. 2 is a cross-sectional view of the body of the double-ended gage taken along line 2—2 of FIG. 1;

FIG. 3 shows the body of a clamp-on gage contemplated by this invention;

FIG. 4 is a cross-sectional view of the body of the clamp-on gage taken along line 4—4 of FIG. 3;

FIG. 5 shows the body of an electrical gage contemplated by this invention;

FIG. 6 is a side view of the body of the electrical gage with a cross-sectional view taken along line 6—6 of FIG. 5;

FIG. 7a shows the thin metal piece used with a gage;

FIG. 7b shows the thin metal piece attached to the body of a gage;

FIG. 7c shows the thin metal piece shaped to fit the face of the body;

FIG. 8 is a view of the tool used to shape the foil;

FIG. 9 shows the apparatus utilized for directional testing; and

FIG. 10 is a top view of 42 and 42' of FIG. 9.

DESCRIPTION OF THE PREFERRED EMBODIMENTS

Referring now to the drawings, wherein like reference characters designate like or corresponding parts throughout the several views, there are shown in FIGS. 1, 3 and 5 three types of gages contemplated by this invention, a double-ended gage, a clamp-on gage and an electrical gage, respectively.

Each of the gages has a solid cylindrical body 11 which is generally made of steel. An annular groove 13 is machined in a face 12 of the cylinder, a hole 14 is tapped and threaded in the center of this face, and the edge 15 of the face is beveled.

A thin cylindrical disc 31 (FIG. 7a) made of a pliable metal such as aluminum is mounted on the face 12 of the cylinder (FIG. 7b) by means of a screw threaded in hole 14. The disc has the same outside diameter as the cylinder 11 and its edge is pressed against bevel 15 (FIG. 7c) by tool 33 (FIG. 8).

The double-ended gage shown in FIGS. 1 and 2 has a foil mounted on each face 12 and 12' of the cylinder 11.

The clamp-on gage shown in FIGS. 3 and 4 has a slot 16 cut in one end of the cylinder 12 and has a threaded hole 17 tapped through the cylinder to the slot 16.

The electric gage shown in FIGS. 5 and 6 has two silver contacts 21 and 21' located in the annular groove 13 on the face of the cylinder. The contacts are separated from the cylinder by insulators 22 and 22' and are connected to external electrical equipment through conducting rods 24 and 24'. Rods 24 and 24' are separated from cylinder 12 by insulators 23 and 23'. The rod 24 and insulator 23 are held in place by set screw 25. Ground post 27 is attached to the cylinder at the rear face and is also connected to the external electrical equipment. Groove 28 is provided for attaching the gage to a support.

In operation a plurality of the gages are anchored in place with their disc-covered ends facing the source of shock waves. When the shock waves strike a disc 31, it deforms into the annular groove and this deformation is measured and correlated with a calibrated graph to determine the pressure of the shock waves at that gage.

The discs 31 are pressed against the beveled edges 15 of the cylinder faces 12 to insure that each disc presents the same surface area to the shock waves. This also makes certain that the disc forms a tight fit with the cylinder.

Test data has shown that an aluminum disc having a thickness of 10 mils gives reliable results in the range of 25 to 1350 p.s.i. The disc is thick enough to prevent fracture when struck by fragments from exploding charges. Furthermore, test results show that valid results can be achieved when most of the surface of the disc has been struck by fragments.

The annular groove 13 limits the amount of deformation of the discs. The pressure of the shock waves on the surface of the discs is balanced in part by the compression air forces in the groove. The depth of the annular groove must be chosen to insure that the compression forces are not so large as to prevent substantial deformation of the disc. Tests have shown that a 3 to 20 ratio of the depth of the groove to the diameter of the face yields accurate results.

The double-ended gage (FIGS. 1 and 2) is normally used in locations where it is infrequently moved. It is essentially two gages on one body. The gage is either welded or clamped to a support. When one face of the cylinder is multilated the gage is reversed in position. Its use insures that spare gages will be available at the test site.

The clamp-on gage (FIGS. 3 and 4) is used when there is a desire to shift location of the gage frequently. The gage is often mounted on an arched support and shifted to various points on the arch.

When associated electrical equipment is used, the electric gage (FIGS. 5 and 6) can be used for concurrent measurement of pressure and time of arrival of a shock wave. In operation only one contact 21 is connected to the electrical equipment. The two contacts are necessary to insure symmetrical deformation.

The operation of the gage and electrical equipment is such that the equipment receives a first signal when the shock wave is generated. When the wave strikes the foil 41 it is deformed and touches the contact 21. This completes a circuit from the equipment through rod 24, contact 21, disc 31, cylinder 12 and ground post 26 back to the electrical equipment. This in turn generates a second signal and the equipment gives an output indicative of the elapsed time.

The gages can be used to measure the effective direction of the peak pressure of the shock wave at a given point when used in conjunction with the apparatus shown in FIG. 9. The apparatus consists of two circular discs 42 and 42' mounted on an L-shaped rod 41 in such a manner that one disc lies in the horizontal plane and one disc in the vertical plane.

If accurate measurements are desired a plurality of double-ended gages mounted on each disc with the discs facing radially outward may be used. The combination of the apparatus and the double-ended gage constitutes a directional gage. The double-ended gage which registers the greatest foil deformation defines the direction of the source of pressure.

A directional gage, however, is often used where the tester feels that the full force of the shock waves is coming from a direction other than the actual location of the sources of shock waves. Accurate measurements are not necessary. In this instance discretely spaced holes that face radially outward may be drilled in discs 42 and 42' and a strip of thin metal coil placed over the holes. As with the use of the double-ended gages the hole that registers the greatest foil deformation defines the direction of the source of pressure.

Thus it is seen that a gage for measuring pressure has been provided which is inexpensive and simple to construct. The gage gives accurate measurements and is not easily destroyed by fragments from exploding charges.

Obviously many modifications and variations of the present invention are possible in light of the above teachings. It is therefore to be understood that within the scope of the appended claims, the invention may be practiced otherwise than as specifically described.

What is claimed is:

1. A deformable gage for measuring the pressure of shock waves which comprises:
   a solid body member having at least one face which is adapted to be mounted on a support;
   said body having a shallow aperture in a face and said face having a circumferential beveled edge and
   a piece of thin metal attached externally to said body member at said face cover completely covering said aperture and permanently deformed so as to contact and conform to the shape of said beveled edge;
   whereby said metal piece deforms into said aperture in an amount that is a function of the intensity of any shock waves incident thereon.

2. A deformable gage for measuring the pressure of shock waves as in claim 1, wherein said body member has a plurality of apertures, each of which is covered with a piece of thin metal.

3. A deformable gage for measuring the pressure of shock waves as in claim 1 wherein
   said body member has a cylindrical shape; and
   said aperture comprises an annular groove in one end face of said body member.

4. A deformable gage for measuring the pressure of shock waves as in claim 1 further comprising
   a second piece of thin metal; and
   wherein the other face of said cylindrical-shaped body member has an annular groove and a beveled edge against which said second piece of thin metal is pressed.

5. A deformable gage for measuring the pressure of shock waves as in claim 1 wherein
   a slot is cut in the side of said cylindrical-shaped body member and means are provided adjacent to the slot for attaching said cylindrical-shaped body to a support at said slot.

6. A deformable gage for measuring the pressure of a shock wave as in claim 1 further comprising:
  an insulated contact attached to said cylindrical-shaped body member and located within said annular groove of said body member;
  a conductor attached at one end to said contact and adapted for connection with external electrical equipment at the other end; and
  a grounding post attached to said cylindrical body; said grounding post being adapted for attachment to external electrical equipment.

7. A deformable gage as claimed in claim 1 and further comprising attaching means securing said metal piece to said body member in a manner that does not shield any portion of the covered aperture from the effects of incident shock waves.

References Cited

UNITED STATES PATENTS

| | | | |
|---|---|---|---|
| 3,345,876 | 10/1967 | Smith | 73—388 |
| 3,184,955 | 5/1965 | Filler | 73—35 |
| 3,108,466 | 10/1963 | Sander et al. | 73—35 |

OTHER REFERENCES

Loren E. Bollinger et al., Measurement of Detonation-Wave Velocities, May 1957, I.S.A. Journal, pp. 170–173.

RICHARD C. QUEISSER, Primary Examiner

J. WHALEN, Assistant Examiner

U.S. Cl. X.R.

73—12, 388